Mar. 3, 1925.  
J. MESSING  
1,527,989  
BED FOR USE IN CONNECTION WITH VEHICLES  
Filed Jan. 13, 1923  2 Sheets-Sheet 1
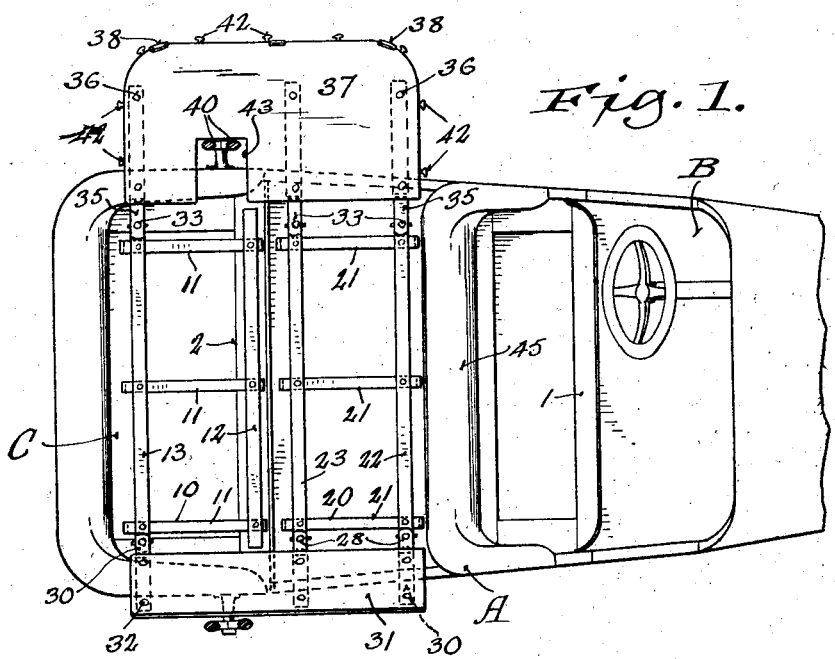
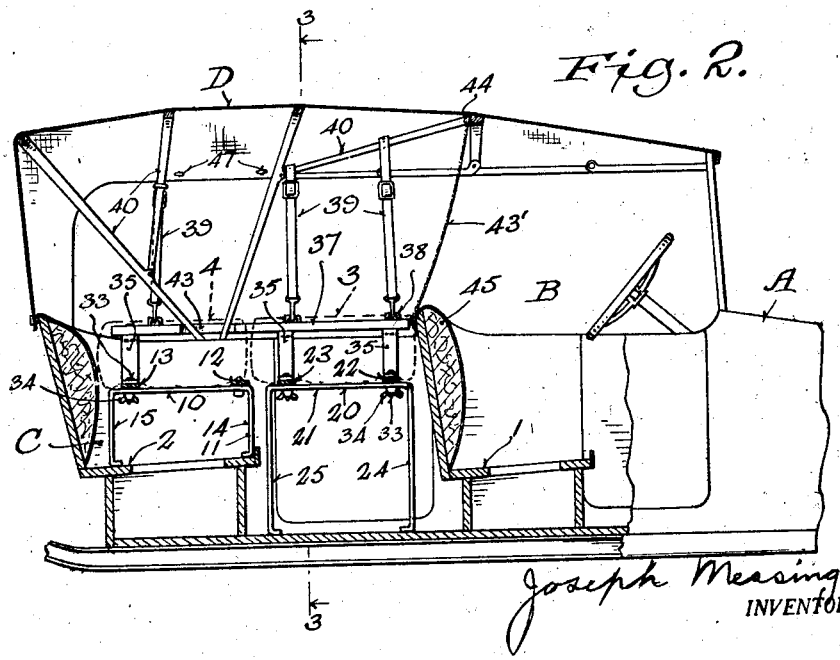
Joseph Messing  
INVENTOR.
BY Erwin, Wheeler & Woolard  
ATTORNEYS.

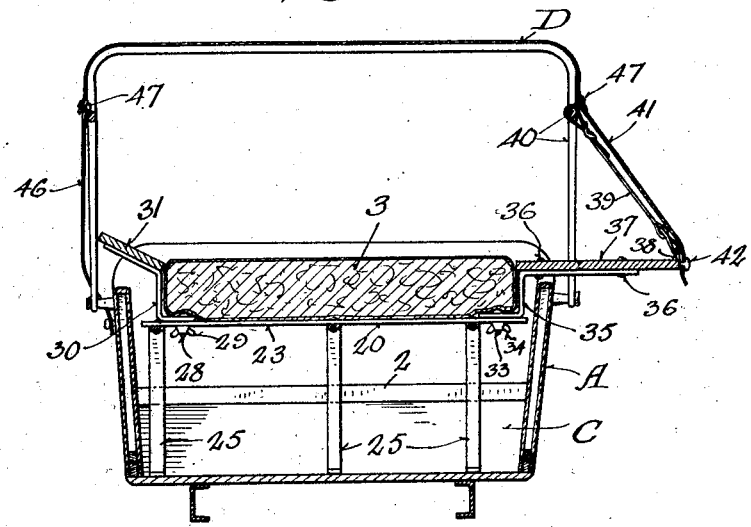

Patented Mar. 3, 1925.

1,527,989

UNITED STATES PATENT OFFICE.

JOSEPH MESSING, OF MILWAUKEE, WISCONSIN.

BED FOR USE IN CONNECTION WITH VEHICLES.

Application filed January 13, 1923. Serial No. 612,425.

*To all whom it may concern:*

Be it known that I, JOSEPH MESSING, a citizen of the United States, residing at Milwaukee, county of Milwaukee, and State of Wisconsin, have invented new and useful Improvements in Beds for Use in Connection with Vehicles, of which the following is a specification.

This invention relates to improvements in beds for use in connection with vehicles.

The principal object of this invention is to provide for touring cars a bed utilizing, in part, the automobile cushions, and providing extensions beyond said cushions in a plane to support the head and feet of the occupant, thereby increasing the length of the bed. It is preferable that the bed be positioned transversely of the automobile, so that the plane of the bed may be as low as possible to avoid placing the occupant in stifling proximity to the top of the car, thereby enabling the occupant to enjoy to the fullest extent, the pleasure of sleeping out of doors.

A further object of this invention is to provide an automobile bed having a framework and head and foot board adapted for attachment thereto, said framework and boards being of cheap construction, easily assembled within the rear compartment of an automobile, and when so assembled, free from contact with any portion of the automobile that might easily be marred.

Another object of this invention is to provide such a transverse bed in which the occupant may be protected from the weather and insects by the top of the car, curtains thereon adjacent the head and foot of the bed and netting supported from the top and shutting off the front of the compartment in which the bed is assembled.

In accomplishing these objects. I have provided for touring cars a bed in which the occupant will at all times receive a plentiful supply of fresh air.

In the drawings:—

Fig. 1 is a plan view of an automobile body with the top removed, showing the framework and head and foot boards attached thereto.

Fig. 2 is a side elevation of the same partly in section.

Fig. 3 is a sectional view taken on the line 3—3 of Fig. 2, showing one of the seat cushions in place upon the bed frame.

Like parts are identified by the same reference characters throughout the several views.

An automobile body A provided with front compartment B and rear compartment C, has a top D. The front compartment is provided with a seat frame 1 and the rear compartment with a seat frame 2 adapted respectively to support the cushions 3 and 4 which are shown in dotted lines in Fig. 2, disassociated from their respective seat frames and supported for use as a bed hereinafter described.

A framework, designated generally by the numeral 10, is adapted to rest upon the seat 2 and to support cushion 4. The framework 10 is composed of supporting members 11, spaced apart, and longitudinal strips 12 and 13 secured thereto. The members 11 are formed of a strip of metal shaped to form legs 14 and 15, the legs 15 being longer than legs 14 in order to compensate for the slope of the seat and to maintain the top of the framework substantially horizontal.

A similar framework 20 is provided adapted to rest upon the floor of the rear compartment or tonneau and to support cushion 3. This framework is built of supporting members 21 spaced apart and longitudinal strips 22 and 23 secured thereto. The members 21 are formed of a strip of metal shaped to form legs 24 and 25. The legs are made of sufficient length to support the top of the frame 20 in a plane substantially coinciding with the plane of the top of frame 10.

Detachably secured to one end of the members 22, 23, and 13 by bolts 28 and wing nuts 29 are angular supports or brackets 30. A board 31, adapted to support the head of a person, is secured to the supports 30 by rivets 32 or similar means, the supports 30 being designed to support the board at an angle.

Secured to members 22, 23 and 13 by bolts 33 and wing nut 34 are angular supports or brackets 35 adapted to extend over the top of and outwardly from the body A. Secured to the supports 35 by rivets 36 is a board 37 adapted to support the feet of a person. Board 37 is provided with eyes 38 to which straps 39 are adapted to be attached. The straps are adapted to engage the frame 40 of the top D and, when so attached, to assist the supports 35 in supporting the board when extra pressure is placed thereon. The board 37 is provided with a slot 43 adapted to receive that portion of the frame 40 which is pivoted to the body A. The side curtain 41 may be secured at the usual points on the top and to the outer margins of the board 37 by buttons 42. Another curtain 46 may be secured to the top and body at the head of the bed and netting 43' may be attached to the transverse piece 44 of the top and to the body at the rear of the back cushion 45 of the front seat. When the occupant does not require protection against the weather, netting may be used in the place of the curtains for the purpose of excluding insects from the rear compartment.

When it is desired to assemble the bed in an automobile, the rear cushion 4 is removed from the seat 2 and the bed frame 10 is placed thereon as shown. The bed frame 20 is then placed in the position shown and the head and foot supports 31 and 37 are secured to the frames 10 and 20 by their respective bolts and nuts. The cushions 3 and 4 are then assembled upon the bed frames and the straps 39 are secured to the foot support and top frame 40. The bed is then ready for occupancy. When the curtain 41 is in place the straps 39 will act as very substantial supports for the curtain. The curtains 41 and 46 are secured to the inner side of the top by buttons 47 to thereby shed any rain which may otherwise tend to enter the compartment between top and the curtains.

It is preferred that the plane of the cushions be as low as possible relative to the top margin of the body at the same time permitting the foot board to extend over the body in the plane of the cushions. The bed will in this manner be positioned slightly below the top margins of the backs of the seats and give the occupant plenty of air space between the bed and the top of automobile.

I claim:

1. A bed for an automobile having a rear compartment provided with a seat, said bed comprising a frame for supporting a cushion, said frame being adapted to rest upon said seat, a second frame for supporting a cushion in a plane substantially coinciding with the plane of the first mentioned cushion, said second frame being adapted to rest upon the floor of said compartment, and means laterally exterior to said frames for supporting the head and foot of a person upon cushions so supported.

2. A bed for an automobile provided with a body having a rear compartment and a seat therein, said bed being adapted to be arranged transversely of said compartment, said bed comprising a frame adapted to rest upon said seat, a second frame adapted to rest upon the floor of said compartment, a head support adapted to be detachably secured to said frames, a foot support adapted to be detachably secured to said frames, and means for supporting the outer end of said foot board.

3. A bed for an automobile provided with a body having a top and a rear compartment provided with a bottom, said bed being adapted to be arranged in said compartment and supported from said bottom, a head board, means for detachably securing said head board to said bed, a foot board, and means for detachably securing said foot board to said bed and top, and means whereby one end of said foot board may be supported from said top.

4. In a bed for an automobile, the combination with a pair of frames each adapted to support a cushion independently of the other, one of said frames having relatively short standards adapted to rest upon the rear seat of an automobile, and the other of said frames having relatively long standards adapted to support its top at like height from the floor immediately in front of said seat, of a head support adapted to be detachably secured to corresponding ends of said frames, and a foot support adapted to be detachably secured to the other ends of said frames.

5. A support for automobile beds, said support including a pair of frames, each of said frames comprising a pair of substantially parallel, spaced, longitudinal strips, a pair of transverse strips secured to said longitudinal strips at the opposite ends thereof, legs upon the under side of said transverse strips, a set of brackets having vertically offset arms, a board secured to said brackets, a second set of brackets, a second board secured thereto, and a plurality of bolts and nuts detachably securing said brackets to the longitudinal strips.

6. A support for automobile beds, said support including a plurality of longitudinal strips, a plurality of transverse strips secured thereto, a plurality of legs upon said transverse strips, a plurality of brackets having horizontally extending, vertically offset arms, a second set of brackets having horizontally extending arms and upwardly inclined arms vertically offset from the first arms, and means for detachably securing said arms to said longitudinal strips.

JOSEPH MESSING.